Jan. 18, 1955    R. A. ARMS    2,699,597
METHOD OF MANUFACTURING FINGER CONTACTS
Filed Feb. 7, 1950    2 Sheets-Sheet 1

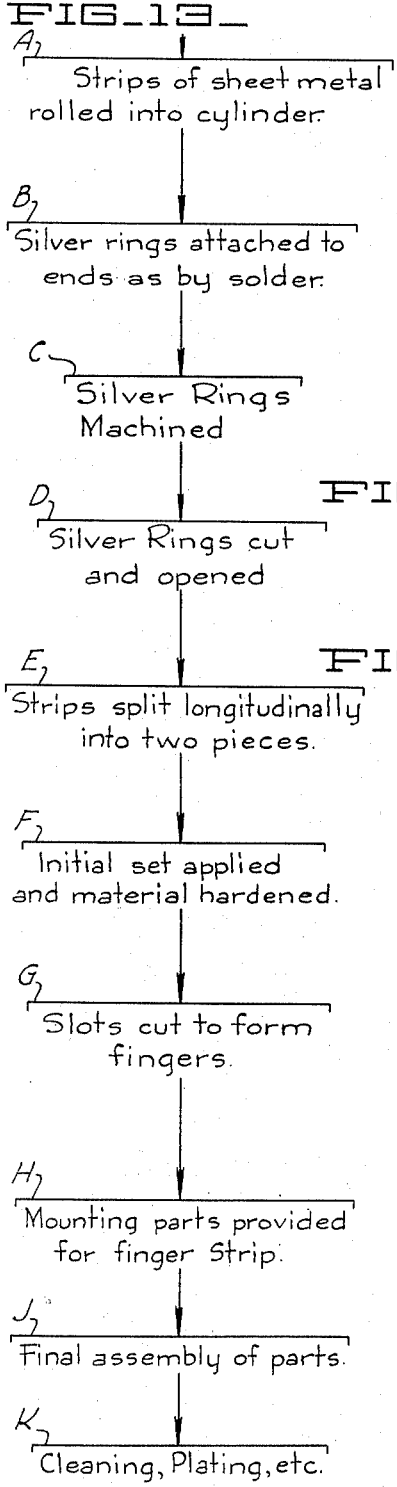

FIG_13_

A) Strips of sheet metal rolled into cylinder.

B) Silver rings attached to ends as by solder.

C) Silver Rings Machined

D) Silver Rings cut and opened

E) Strips split longitudinally into two pieces.

F) Initial set applied and material hardened.

G) Slots cut to form fingers.

H) Mounting parts provided for finger strip.

J) Final assembly of parts.

K) Cleaning, Plating, etc.

FIG_1_
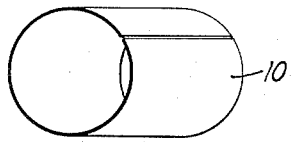

FIG_2_
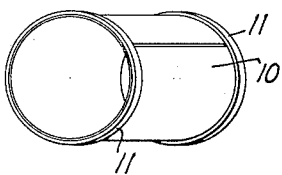

FIG_3_
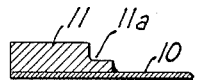

FIG_4_
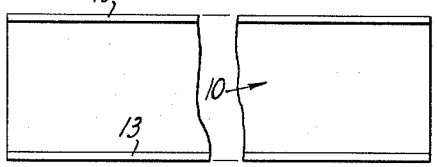

FIG_5_
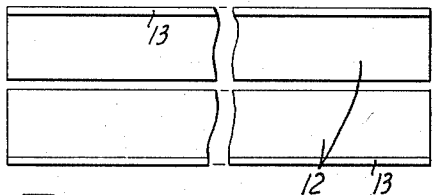

FIG_6_
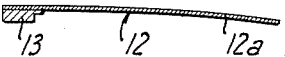

FIG_7_
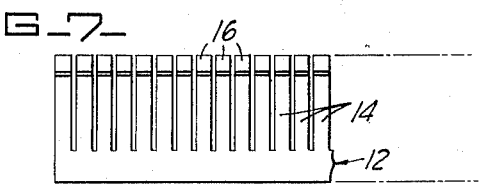

FIG_8_
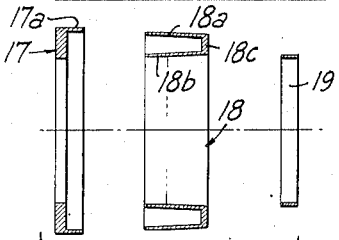

INVENTOR
Richard A. Arms
ATTORNEYS

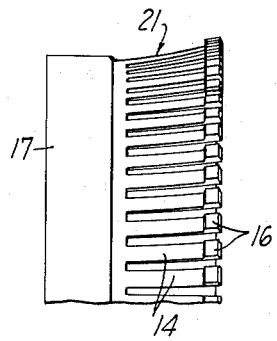
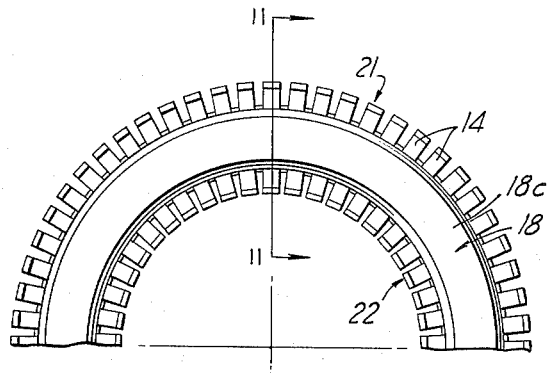
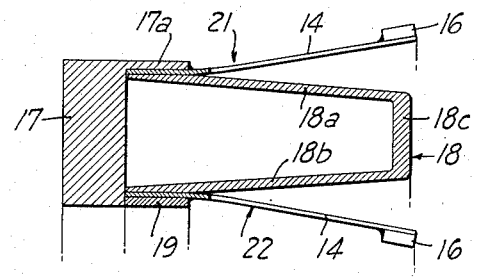
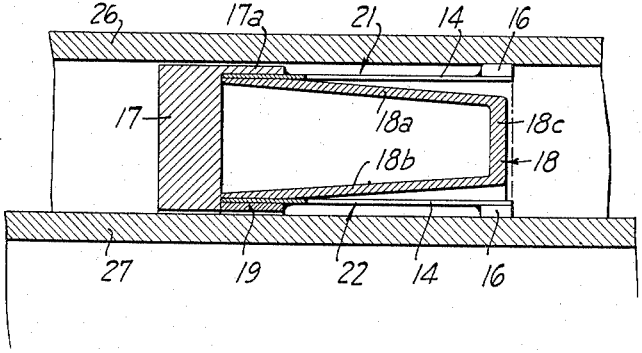

United States Patent Office 2,699,597
Patented Jan. 18, 1955

2,699,597

METHOD OF MANUFACTURING FINGER CONTACTS

Richard A. Arms, Menlo Park, Calif., assignor to Hewlett-Packard Company, Palo Alto, Calif., a corporation of California Application February 7, 1950, Serial No. 142,746

3 Claims. (Cl. 29—155.55)

This invention relates generally to finger contacts and finger contact assemblies such as are suitable for use with very high frequency electrical equipment, and to methods for their commercial manufacture.

Finger contacts have a number of applications in very high frequency electrical equipment, including particularly their use in the construction of cavity plungers, and joints for connecting high frequency conductors and wave guides. In order to meet the exacting requirements of such equipment, it has been customary in the past to employ expensive manufacturing methods for the production of such contacts, including step by step slotting of metal members in a semicompleted or completed mounting, to form the individual fingers. For the ordinary annularly grouped fingers the material from which they are formed is machined from solid stock, thus necessitating a sequence of operations poorly adapted to low cost quantity production. When made for engaging tubes or conductors of the smaller sizes, the limitations of the method employed has resulted in contact faces which are too large in area for good electrical contact.

It is an object of the present invention to provide a finger contact assembly and method of manufacture which will enable quantity production at a cost relatively low compared to prior conventional manufacturing methods.

Another object of the invention is to provide a contact assembly and method of manufacture which will avoid expensive machining operations, and which will make possible standardization with respect to tooling for universal production of a wide variety of sizes.

Another object of the invention is to provide a finger contact assembly and method of manufacture which will be superior to assemblies which have been manufactured in the past, particularly with respect to securing good electrical contact in the various applications for which the assembly may be employed.

Additional objects of the invention will appear from the following description in which the preferred embodiments have been set forth in detail in conjunction with the accompanying drawing.

Referring to the drawing:

Figure 1 is a perspective view illustrating an initial step in the method of manufacture.

Figure 2 is a perspective view illustrating a subsequent step in the manufacture.

Figure 3 is a cross-sectional detail illustrating the manner in which silver rings on the end of the assembly of Figure 2 can be machined preparatory to subsequent manufacturing operations.

Figure 4 is a plan view illustrating another operation in the manufacture, involving flattening the material shown in Figures 2 and 3 to form a strip of material.

Figure 5 is a plan view illustrating a step following the step illustrated in Figure 4, and in which the strip of Figure 4 is severed to form two strips of material.

Figure 6 is a cross-sectional detail of one of the strips shown in Figure 5, and illustrating an additional step in which the material is preset.

Figure 7 is a plan view illustrating the strip of material after a slotting operation to form the separate finger contacts.

Figure 8 is an exploded view illustrating annular members used in forming my complete finger contact assembly.

Figure 9 is a side elevational view of a complete finger assembly suitable for use with a cavity resonator.

Figure 10 is a half front view of the assembly shown in Figure 9.

Figure 11 is an enlarged cross-sectional detail taken along the line 11—11 of Figure 10.

Figure 12 is an enlarged cross-sectional detail like Figure 11 but showing the assembly applied to tubular conductors.

Figure 13 is a diagram showing the various manufacturing steps employed.

The present invention is characterized by the fact that separate finger contact strips are prepared, and are assembled together with other readily manufactured parts to form the final complete assembly. A simple procedure is provided for manufacture of the strips to any size desired, and these strips can then be placed in stock for subsequent incorporation in various contactor assemblies.

The complete assembly incorporating the present invention is illustrated in Figures 9 to 11 inclusive. Various steps of the method which can be employed for the manufacture of this complete assembly are set forth in the diagram of Figure 13. Figures 1 to 8 inclusive are drawn alongside various corresponding steps of the diagram.

The features of a typical complete assembly such as illustrated in Figures 9 to 11 inclusive, can be best understood after describing the various steps of the manufacturing method employed, by reference to Figure 13. Step A represents the first operation in the manufacture of the finger contacts. In this operation a strip 10 of suitable metal, such as beryllium copper, is rolled to cylinder form as illustrated in Figure 1. In the next step B suitably dimensioned rings 11 are fitted upon the ends of the strip 10 and are secured thereto as by hard solder. These rings are made of suitable electrical contact material such as hard silver.

In step C the silver rings are finished by machining in order to provide the dimensions desired and to insure proper contacting surfaces. Thus the outer and end faces of the rings can be finished as by grinding or by cutting with a suitable lathe tool, and it is desirable to cut away one corner as indicated at 11a in Figure 3, to make certain that no solder exists upon the outer peripheries.

In the next step D the silver rings are severed along the line of contact between the ends of the strip, and then the strip is straightened out to planar form as illustrated in Figure 4. In step E the strip of Figure 4 is cut longitudinally to form the two strips 12 as in Figure 5. Each of these two strips has a ridge 13 of silver extending along one edge of the same, formed by straightened out silver ring 11.

In step F it is assumed that only one of the strips of Figure 5 is being worked upon, and in this operation the strip is bent into predetermined form, and then is hardened by conventional methods. A suitable form is illustrated in Figure 6, in which a bend has been applied in the longitudinally extending region 12a, whereby that side of the strip upon which the ridge 13 is located, is slightly concave. In operation G the strip 12 is slotted as illustrated in Figure 7, to form the separate fingers 14, and the separate contact elements 16 on the end of each finger. This slotting operation can be conveniently performed by suitable machines of the punch or jig type, making use of slotting dies capable of providing all of the slots of a strip in one punching operation.

In step H additional parts are provided in preparation for making a complete assembly of the type illustrated in Figures 9 to 11 inclusive. The nature of these parts will vary in different types of assemblies. In the typical instance illustrated, the parts include a metal mounting ring 17, a metal filler ring 18, and a metal retaining band 19. All of these parts are made of suitable material such as brass. The ring 17 includes a rim 17a which extends from one side face of the same. The filler ring 18 can be machined from solid metal stock, or formed by a suitable spinning or pressing operation. Its cross-sectional contour is generally in the form of a truncated cone, or in other words it is provided with outer and inner conical shaped walls 18a and 18b, which are formed integral with the end wall 18c. The maximum diameter of the wall 18a is slightly less than the internal diameter of rim 17a. The inner diameter of wall 18b is slightly greater than the inner diameter of the mounting ring 17, and is slightly greater than the external diameter of band 19.

In the final assembly of the parts indicated by step J, the parts of Figure 8 are assembled with two contactor strips as shown in Figure 7. The ring 18 is seated upon the mounting ring 17, within the rim 17a, and then a contactor strip having a length corresponding substantially to the outer perimeter of wall 18a, is bent to circular form and inserted between the base of this wall and the rim 17a. A second contactor strip of proper length is then bent to circular form and inserted within the wall portion 18b, and the retaining band 19 is positioned as illustrated.

The operations described above under step J can be best understood by reference to the complete final assembly illustrated in Figures 9 to 11 inclusive. The outer and inner contacting strips formed as indicated in Figure 7 have been designated generally by numerals 21 and 22. It will be noted that the unslotted base portion of strip 21 is positioned between the rim 17a and the wall portion 18a, and likewise the base portion of contactor strip 22 is between the wall portion 18b and the band 19. The strips have been applied whereby the individual fingers 14 occupy the unstressed positions illustrated in Figure 11. In other words, the contact elements 16 of the outer strip 21 have their outer faces on a diameter substantially greater than the outer diameter of the mounting ring 17, and the elements 16 of the inner strip 22 are on a diameter substantially less than the inner diameter of the mounting ring.

During or after the assembly of the parts as described above, suitable solder is applied after which the assembly is heated to effectively bond the parts together. The base portions of the strips 22 and 23 are thus effectively bonded to the rim 17a and the adjacent wall portion 18a, and to the wall portion 18b and band 19.

After forming an assembly as illustrated in Figure 11, the next operation K is to clean the assembly, and then apply any finishing desired, such as silver plating or the like.

In Figure 12 I have shown the completed and finished assembly inserted between the concentric tubular conductors 26 and 27 of very high frequency electrical equipment, whereby the assembly functions as a plunger of a cavity resonator. It will be noted that both sets of fingers 14 are sprung toward the filler ring 18. Such stressing, which is well within the elastic limit of the beryllium copper or like material employed, serves to urge the faces of the contact elements 16 into good electrical engagement with the adjacent peripheries of the tubular conductors 26 and 27.

It will be evident that the invention described above has many advantages over prior methods and finger contact assemblies. Expensive and troublesome machining operations are eliminated, and the method of manufacture and assembly is such that parts can be separately stocked, as for example the separate complete strips illustrated in Figure 7. These strips can be made in a minimum number of sizes, and then cut to different lengths to suit a wide variety of assemblies. The various machining operations utilized according to my method make possible universal production of all sizes desired, whereas the prior methods employed necessitated individual tooling for each contactor assembly size and type. In general the overall cost of producing assemblies according to the present method is less than one-half the cost of conventional methods.

In addition to the advantages of my manufacturing method, the final assembly is superior to assemblies produced by conventional methods. The contact elements 16 can be made of lesser width, and as a result they can be made to have more effective contact with the adjacent peripheral surface of a tubular or solid conductor. Conventional methods have produced contacts which could not be reduced in width beyond certain minimum dimensions, and as a result when made for the smaller diameters, the individual contact elements have engagement only on their corners, instead of over their entire faces. With my invention the contact faces can be made relatively narrow to afford good contact on a small diameter.

It will be evident that my method and the assembly illustrated in Figures 9 to 12, inclusive, can be modified in many respects, within the scope of the invention. For example, in many instances the assembly may employ only one contactor strip, in place of two. The final assembly need not be annular in contour, but may be elliptical, square or rectangular, to suit the contour of very high frequency wave guides or conductors.

I claim:

1. In a method for the manufacture of finger contacts for very high frequency equipment, the steps of bending a strip of spring metal into a cylinder, telescoping the ends of said cylinder into rings of electrically conducting material, soldering said rings to each end edge of the cylinder, machining said rings to a predetermined contour, severing both said rings along the line of junction between the ends of the said strip, flattening out the assembly to form a strip, the rings serving to provide ridges of good electrical conductive material extending along and confined to the side margins of the same, severing said strip to form two strips, each of said two strips including one of said ridges and being suitable for the manufacture of finger contacts, bending each of said strips to provide a slight concavity extending longitudinally of same, hardening the strips, and then slotting the strips from one edge of the same, said slots extending through said ridges and serving to form a series of spring finger contacts having portions of said last named ridge on the free ends of the same, said slots each being open on one end and having a substantial width whereby the spring fingers thereby formed have spaced parallel opposed edges.

2. In a method for the manufacture of finger contacts for very high frequency equipment, the steps of forming a strip of spring metal into the form of a cylinder, telescoping the ends of said cylinder into rings of electrically conducting material, soldering said rings to each end edge of the cylinder, machining said rings to a predetermined contour, severing said rings along the line of junction between the ends of the said strip, flattening out the assembly to form a strip, severing said strip along its center line to form two strips, the rings forming a ridge along one edge of each of said strips, and then slotting said strips through said ridge to form a plurality of spring contact fingers having portions of the ring on the free ends of the fingers, said slots each being open on one end and having a substantial width whereby the spring fingers thereby formed have spaced parallel opposed edges.

3. In a method for the manufacture of finger contacts for very high frequency equipment, the steps of forming a strip of spring metal into the form of a cylinder, telescoping the ends of the said cylinder into rings of electrically conducting material, soldering said rings to each end edge of the cylinder, machining said rings to a predetermined contour, severing said rings along the line of junction between the ends of the strip, flattening out the assembly to form a flat strip, the machined rings forming ridges along each side edge of the strip, slotting each strip through each of said ridges to provide a plurality of spring fingers having contact elements formed of portions of said machined ring on their free ends, said slots each being open on one end and having a substantial width whereby the spring fingers thereby formed have spaced parallel opposed edges.

References Cited in the file of this patent

UNITED STATES PATENTS

| Number | Name | Date |
| --- | --- | --- |
| 842,829 | Duncan | Jan. 29, 1907 |
| 1,105,489 | Clement | July 28, 1914 |
| 1,708,193 | Sherwood | Apr. 9, 1929 |
| 2,278,744 | Sparrow | Apr. 7, 1942 |
| 2,320,541 | Wilson | June 1, 1943 |
| 2,426,429 | Bels | Aug. 26, 1947 |
| 2,429,048 | Cohen | Oct. 14, 1947 |
| 2,456,902 | Treuthart | Dec. 21, 1948 |
| 2,458,552 | Blattner | Jan. 11, 1949 |
| 2,486,285 | Hurst | Oct. 25, 1949 |

FOREIGN PATENTS

| Number | Country | Date |
| --- | --- | --- |
| 496,593 | Great Britain | Dec. 2, 1938 |